(12) United States Patent  
Dudovitch et al.

(10) Patent No.: US 12,518,945 B2  
(45) Date of Patent: Jan. 6, 2026

(54) USING LASER BEAM FOR SEM BASE TOOLS, WORKING DISTANCE MEASUREMENT AND CONTROL WORKING DISTANCE SEM TO TARGET

(71) Applicant: APPLIED MATERIALS ISRAEL LTD., Rehovot (IL)

(72) Inventors: Ofer Dudovitch, Rehovot (IL); Ido Ben Noon, Rehovot (IL); Efi Zertser, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 528 days.

(21) Appl. No.: 18/072,451

(22) Filed: Nov. 30, 2022

(65) Prior Publication Data

US 2024/0177962 A1 May 30, 2024

(51) Int. Cl.  
*H01J 37/20* (2006.01)

(52) U.S. Cl.  
CPC .................................. *H01J 37/20* (2013.01)

(58) Field of Classification Search  
USPC ........................................................ 250/310  
See application file for complete search history.

(56) References Cited

U.S. PATENT DOCUMENTS

| 6,407,373 | B1 | 6/2002 | Dotan |
| 10,641,607 | B2 | 5/2020 | Sekiguchi et al. |

(Continued)

FOREIGN PATENT DOCUMENTS

| EP | 3823004 A2 | 5/2021 |
| WO | 2020046488 A2 | 3/2020 |

OTHER PUBLICATIONS

PCT/US2023/080810, "International Search Report and the Written Opinion", Mar. 22, 2024, 9 pages.

(Continued)

*Primary Examiner* — Kiet T Nguyen  
(74) *Attorney, Agent, or Firm* — Kilpatrick Townsend & Stockton LLP

(57) ABSTRACT

A system for processing a sample comprising: a vacuum chamber having a window formed along one of its walls; a sample support configured to hold a sample within the vacuum chamber during a sample processing operation and move the substrate within the vacuum chamber along the X, Y and Z axes; a charged particle beam column configured to direct a charged particle beam into the vacuum chamber and focus the beam to collide with a region of interest on the sample; an optical distance measurement device configured to generate and direct electromagnetic radiation into the vacuum chamber through the window, detect photons from the electromagnetic radiation reflected off the sample, and determine a working distance between the sample and charged particle column based on the generated electromagnetic radiation and the detected photons; and one or more mirrors disposed within the vacuum chamber and positioned to direct the electromagnetic radiation generated by the optical distance measurement system to a measured location on the sample that is in close proximity to the region of interest, the one or more mirrors comprising at least one mirror positioned directly under a portion of the charged particle column.

19 Claims, 4 Drawing Sheets

(56) References Cited

U.S. PATENT DOCUMENTS

| | | | |
|---|---|---|---|
| 2006/0049348 A1 | 3/2006 | Petrov et al. | |
| 2007/0023655 A1* | 2/2007 | Nishikata | H01J 37/244 |
| | | | 250/310 |
| 2019/0013178 A1* | 1/2019 | Zachreson | G02B 26/10 |
| 2019/0198289 A1 | 6/2019 | Gledhill et al. | |
| 2022/0068590 A1 | 3/2022 | Luo et al. | |

OTHER PUBLICATIONS

PCT/US2023/080810, "International Preliminary Report on Patentability", Jun. 12, 2025, 6 pages.

* cited by examiner

USING LASER BEAM FOR SEM BASE TOOLS, WORKING DISTANCE MEASUREMENT AND CONTROL WORKING DISTANCE SEM TO TARGET

BACKGROUND OF THE INVENTION

In the study of electronic materials and processes for fabricating such materials into an electronic structure, a specimen of the electronic structure can be used for microscopic examination for purposes of failure analysis and device validation. For instance, a specimen of an electronic structure such as a silicon wafer can be analyzed in a scanning electron microscope (SEM) to study a specific characteristic feature in the wafer. Such a characteristic feature may include the circuit fabricated and any defects formed during the fabrication process. An electron microscope is one of the most useful pieces of equipment for analyzing the microscopic structure of semiconductor devices.

An SEM instrument can capture images of a region on a sample by generating a charged particle beam and illuminating the sample with the beam. Particles emitted due to the illumination can then be detected in order to generate an SEM image of the region illuminated by the charged particle beam. When obtaining an SEM image, it is important that the sample be positioned at a known working distance away from the charged particle column that generates the charged particle beam.

In some SEM instruments, the working distance between the sample and the charged particle column is measured with a capacitive sensor. Such an arrangement can work well for samples that are electrically conductive. Some semiconductor and other manufacturers, however, are forming devices over dielectric samples (e.g., a sapphire wafer) that are not electrically conductive. Capacitive sensors cannot readily be used to determine working distance with such samples.

Accordingly, new and improved methods and systems for determining the working distance between a sample and a charged particle column are desirable.

BRIEF SUMMARY OF THE INVENTION

Embodiments described herein provide methods and systems for determining the working distance between a sample and a charged particle column that work on both electrically conductive and nonconductive (i.e., dielectric) samples. Some embodiments employ a laser and multiple mirrors to direct a laser beam generated by the laser to a position on the sample that is in very close proximity to the region being imaged. The laser beam can then be reflected from the surface of the sample and directed to a detector where interferometry techniques can be used to determine the working distance between the sample and charged particle column.

While embodiments of the disclosure can be used to measure the working distance between a charged particle column and many different types of samples, some embodiments are particularly useful in performing measurements on samples that are dielectric or semiconductor wafers or similar specimens.

According to some embodiments, a system for processing a sample is disclosed where the system includes: a vacuum chamber having a window formed along one of its walls; a sample support configured to hold a sample within the vacuum chamber during a sample processing operation and move the substrate within the vacuum chamber along the X, Y and Z axes; a charged particle beam column configured to direct a charged particle beam into the vacuum chamber and focus the beam to collide with a region of interest on the sample; an optical distance measurement device configured to generate and direct electromagnetic radiation into the vacuum chamber through the window, detect photons from the electromagnetic radiation reflected off the sample, and determine a working distance between the sample and charged particle column based on the generated electromagnetic radiation and the detected photons; and one or more mirrors disposed within the vacuum chamber and positioned to direct the electromagnetic radiation generated by the optical distance measurement system to a measured location on the sample that is in close proximity to the region of interest, the one or more mirrors comprising at least one mirror positioned directly under a portion of the charged particle column.

In some embodiments, a method of processing a sample in a vacuum chamber with a charged particle column is provided. The method can include: positioning the sample on a sample support in the vacuum chamber such that a region of interest is directly under a tip of the charged particle column; directing electromagnetic radiation to a measured location on the sample in close proximity to the region of interest and directly under a portion of the charged particle column; detecting photons reflected from the measured location; and determining a working distance between the charged particle column and the sample at the measured location based on the emitted electromagnetic radiation and the detected photons. The electromagnetic radiation can be generated by a device outside the vacuum chamber and directed through a window of the vacuum chamber to the measured location by one or more mirrors at least one of which is positioned directly under a portion of the charged particle column.

In some additional embodiments, a non-transitory computer-readable memory that stores instructions for processing a sample in a vacuum chamber with a charged particle column is provided where the instructions cause a sample to be processed in the vacuum chamber by: positioning the sample on a sample support in the vacuum chamber such that a region of interest is directly under a tip of the charged particle column; directing electromagnetic radiation to a measured location on the sample in close proximity to the region of interest and directly under a portion of the charged particle column; detecting photons reflected from the measured location; and determining a working distance between the charged particle column and the sample at the measured location based on the emitted electromagnetic radiation and the detected photons. The electromagnetic radiation can be generated by a device outside the vacuum chamber and directed through a window of the vacuum chamber to the measured location by one or more mirrors at least one of which is positioned directly under a portion of the charged particle column.

Various implementations of the disclosed embodiments can include one or more of the following features. The charged particle column can be a scanning electron microscope (SEM) column and the charged particle beam can be an electron beam. The optical distance measurement device can be configured to generate and direct a laser beam into the vacuum chamber through the window. The window can be formed in a chamber 11d of the vacuum chamber and the optical distance measurement device can be attached directly to the chamber lid and aligned to project the laser beam through the window. The system for processing a sample can further include one or more processors and computer-readable memory operably coupled to the one or more processors. The one or more computer-readable memories can include instructions that, when executed by the one or more processors cause the system to adjust a vertical spacing between the charged particle column and the sample based on a difference between the determined working distance and an intended working distance. The optical distance measurement device can employ interferometry techniques to determine the working distance between the charged particle column and the sample at the measured location. Each of the one or more mirrors can include a reflective ceramic material.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

DETAILED DESCRIPTION OF THE INVENTION

Embodiments described herein provide methods and systems for determining the working distance between a sample and a charged particle column that work on both electrically conductive and nonconductive (i.e., dielectric) samples. Some embodiments employ a laser and one or more mirrors to direct a laser beam generated by the laser to a position on the sample that is in very close proximity to the region being imaged (i.e., the region scanned by the charged particle beam). Photons from the laser beam can then be reflected from the surface of the sample and directed to a detector where interferometry techniques can be used to determine the working distance between the sample and charged particle column. While embodiments of the disclosure can be used to measure the working distance between a charged particle column and many different types of samples, some embodiments are particularly useful in performing measurements on samples that are dielectric or semiconductor wafers or similar specimens.

As used herein, the "working distance" between a charged particle column and a sample is the distance between the electrode of the lens arrangement closest to the sample's plane (i.e., the cap electrode in some examples below) and the sample's plane.

Example Sample Evaluation Tool

Figure 1:
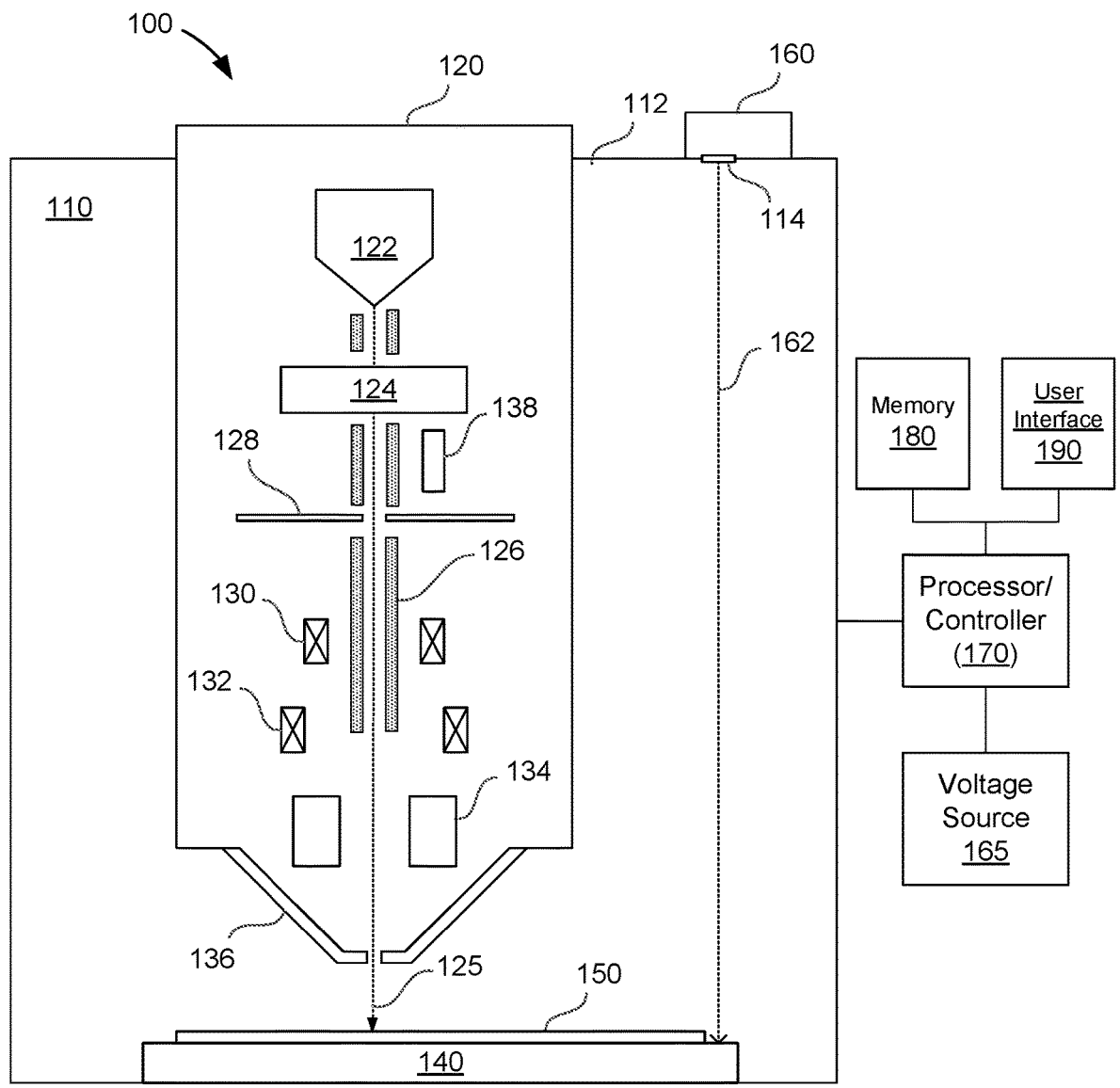
FIG. 1 is simplified illustration of a sample evaluation system that includes a scanning electron microscope (SEM) column.

In order to better understand and appreciate the disclosure, reference is first made to FIG. 1, which is a simplified schematic illustration of a previously known sample evaluation system 100. Sample evaluation system 100 can be used for, among other operations, defect review and analysis of structures formed on samples, such as semiconductor wafers.

System 100 can include a vacuum chamber 110 along with a scanning electron microscope (SEM) column 120. A supporting element 140 can support a sample 150 (e.g., a semiconductor wafer) within chamber 110 during a processing operation in which the sample 150 (sometimes referred to herein as an "object" or a "specimen") is subject to a charged particle beam 126 from the SEM column.

SEM column 120 is connected to vacuum chamber 110 so that charged particle beam generated by the column propagates through a vacuumed environment formed within vacuum chamber 110 before impinging on sample 150. SEM column 120 can generate an image of a portion of sample 150 by illuminating the sample with charged particle beam 125, detecting particles emitted due to the illumination, and generating charged particle images based on the detected particles. Towards this end, SEM column 120 can include an electron beam source 122 (i.e., an "electron gun"), an anode tube 126 that defines the electron beam drift space, a condenser lens arrangement 124, one or more deflecting lenses, such as lenses 130, 132, one or more focusing lenses 134, and a column cap 136.

During an imaging process, electron beam source 122 generates an electron beam 125 that passes through and is initially converged by the condenser lens 124 and then focused by lenses 134 before hitting the sample 150. Condenser lens 124 defines the numerical aperture and current of the electron beam (together with the final aperture) which is directly related to the resolution, while focusing lenses 134 focus the beam onto the sample. Column cap 136, which is located between the lower end of anode tube 126 (a first electrode) and the sample 150 (a second electrode) can be a third electrode in the system that regulates the electric field created within the vicinity of the wafer.

FIG. 1 depicts SEM column 120 generating a charged particle beam 125 that is generally orthogonal to sample 150 when the beam collides with the sample. In various embodiments, SEM column 120 can be operated in a tilted mode where charged particle beam 125 collides with sample 150 at a non-vertical angle, such as a 45 degree angle.

In both regular and tilted modes, the particle imaging process typically includes scanning a charged particle beam back-and-forth (e.g., in a raster or other scan pattern) across a particular area of the sample being imaged. Deflecting lenses 130, 132, which can be magnetic lenses, electrostatic lenses or a combination of both electrical and magnetic lenses, can implement the scan pattern as is known to those of skill in the art. The area scanned is typically a very small fraction of the overall area of sample. For example, the sample can be a semiconductor wafer with a diameter of either 200 or 300 mm while each area scanned on the wafer can be a rectangular area having a width and/or length measured in microns or tens of microns.

SEM column 120 can also include one or more detectors to detect charged particles generated from the sample during an imaging process. For example, SEM column 120 can include an in-lens detector 128 and a top detector 138 that can be configured to detect secondary and backscattered electrons emitted as a result of an illumination of the sample by charged particle beam 126. In-lens detector 128 can include a central hole that allows charged particle beam 126 to pass through the detector and allows both secondary electrons and backscattered electrons that enter the charged particle column 120 to pass through detector 128 to top detector 138. In some embodiments, sample evaluation system 120 can also include an external detector that can also be configured to detect secondary and backscattered electrons or that can be configured to detect x-rays, such as x-ray spectroscopy (EDX) detector.

During operation of system 100, sample support 140 (sometimes referred to herein as a "stage") can move the sample such that different portions (e.g., different regions of interest or "ROIs") are positioned directly under the field of view of SEM column 120. Sample support 140 can move sample 150 within chamber 110 both left and right and forward and back (i.e., along both the X and Y axis) and can also raise and lower sample 150 thus moving the sample along the Z axis.

Since many features formed on sample 150 have dimensions at the micron size or smaller, it is important that location of the sample relative to the focal point of SEM column 120 be precisely known. In order to precisely determine the location of sample 150, a stage-accurate navigation, interferometry system 160 can be used in some embodiments. System 160 can be mounted on a lid 112 of chamber 110 and direct collimated light (e.g., a laser beam) through a window 114 formed on the lid to a target area on sample support 140 that is encoded with various linear or other marks. The system can detect light (e.g., with an array of photodetectors) from the collimated light pulses after being reflected off the encoded target area of sample support 140 back to system 160. Then, a processor within system 160 (e.g., digital signal processor) can analyze the detected light signals to determine a highly accurate location of the sample along the X and Y axis.

Additionally, system 100 can include a voltage supply source 165 and one or more controllers 170, such as a processor or other hardware unit. Voltage supply source 165 can be operated to provide a desired effective voltage of the column to thereby improve the image resolution. This can be achieved by appropriate distribution of the voltage supply between the first and second electrodes (i.e., between the anode tube and the sample). Controller(s) 170 can control the operation of system, including the voltage supply source, by executing computer instructions stored in one or more computer-readable memories 180 as would be known to persons of ordinary skill in the art. By way of example, the computer-readable memories can include a solid-state memory (such as a random access memory (RAM) and/or a read-only memory (ROM), which can be programmable, flash-updateable and/or the like), a disk drive, an optical storage device or similar non-transitory computer-readable storage mediums.

System 100 can further include a user interface 190 that can enable one or more users to interact with the system. For example, user interface 190 can allow a user to set parameters of the SEM column or the detectors that can be used when analyzing a sample. The user interface 190 can include any known device or devices that enable a user to input information to interact with a computer system such as a keyboard, a mouse, a monitor, a touch screen, a touch pad, a voice activated input controller and the like.

Continuous Height Measurements

When an SEM instrument, such as system 100, is used to image or otherwise evaluate a sample, it can be important that the working distance between the column tip and sample be precisely known. It can also be important that the working distance be maintained at a constant distance even when different regions of the sample that are relatively far apart from each other are evaluated.

As discussed above, some SEM systems employ a capacitive distance measurement system to detect the working distance and provide feedback that can be used to adjust the height of the substrate support as appropriate to maintain a desired working distance. Capacitive sensors cannot readily be used to determine working distance with dielectric (non-electrically conductive) samples, however.

It can also be important in some instances that the working distance measurements are taken very close to the location at which the charged particle beam is focused on the sample. For example, while a 200 mm or 300 mm wafer can seem very flat to the naked eye, such wafers typically have some level of warpage to them, and in some instances, the warpage can be up to 200 microns or more. Thus, when an SEM instrument is used to image or otherwise evaluate regions at different locations on the wafer, unless adjustments are made to the height of the sample support or the SEM column, the working distance at the different regions can be slightly different from each other. An actual working distance that is off by even several microns from the expected working distance can adversely impact imaging.

Embodiments disclosed herein provide a system and method for measuring working distance in real time that works with both electrically conductive and electrically nonconductive samples. Additionally, embodiments can measure the working distance at a location directly under a portion of the charged particle column and very close to the focal point of the charged particle beam. For example, some embodiments enable the working distance to be measured at a location within 20 mm, within 10 mm or within 5 mm of the focal point of the charged particle beam. Measuring the working distance in such close proximity to the actual region being imaged or otherwise evaluated with the charged particle beam enables an evaluation system, such as system 100, to adjust the height of the stage and/or charged particle column tip to control and set the working distance to a desired distance.

SEM Instrument with Optical Distance Measurement Device on Chamber Lid

Figure 2:
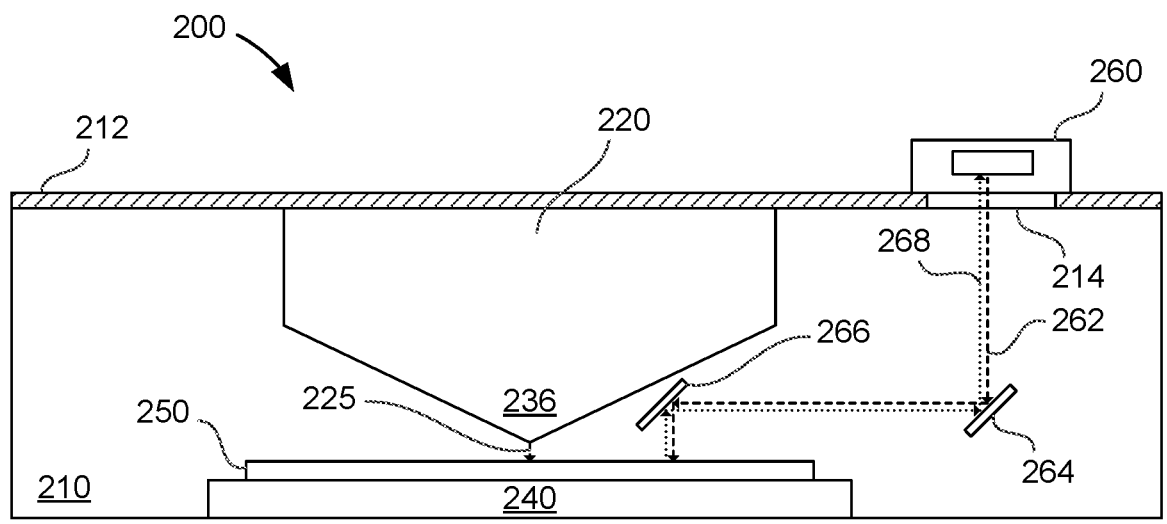
FIG. 2 is a simplified illustration of an evaluation chamber according to some embodiments.

FIG. 2 is a simplified schematic diagram of an SEM instrument 200 according to some embodiments. SEM instrument 200 can perform the various functions discussed above with respect to system 100 and can many of the same elements, which for the sake of brevity, are not described further in conjunction with FIG. 2. As depicted in FIG. 2, SEM instrument 200 can include, among other elements, a vacuum chamber 210, a scanning electron microscope column 220 and sample support 240. Sample support 240 can support a sample 250 and move the sample along the X, Y and Z axes beneath SEM column 220 while a stage-accurate navigation, interferometry system (not shown) tracks location of the substrate support 240 and sample 250 along the X and Y axes. SEM column 220 can generate a charged particle beam 225 (e.g., an electron beam) and direct the beam to collide with a region of interest at an upper surface of sample 250.

SEM instrument 200 can also include an optical distance measurement device 260 that can measure the working distance along the Z-axis between a column tip 236 of SEM column 220 and sample 250. In some embodiments, optical distance measurement device 260 can measure the working distance in real time, for example, while sample 250 is being moved from a first position at which a first region of interest on sample 250 was imaged to a second position in which the SEM instrument 200 will image a second region of interest on the sample. As shown, optical distance measurement device 260 can be positioned outside of chamber 210 and generate and direct a beam of collimated light 262 (e.g., a laser beam) into the vacuum chamber through a window 214. A series of mirrors 264, 266 can then redirect the laser beam 262 so that the beam contacts and is reflected off the upper surface of sample 250 at a location (which can be referred to herein as the "measured location") that is directly underneath a portion of charged particle column 220 and in very close proximity to where charged particle beam 225 is focused on the sample. As depicted, each of the mirrors 264, 266 change the path of the laser beam (and the reflected beam) by 90 degrees and direct laser beam 262 such that it collides with sample 250 at an angle perpendicular to the top surface of the sample. Such a configuration ensures that the reflected beam 268 travels the same general path as laser beam 262 in reverse thus being reflected back to optical distance measurement device 260 through window 214.

In the depicted embodiment, optical distance measurement device 260 is positioned on top of and directly attached to chamber cover 212. The chamber cover can be electrically grounded and kept at or near room temperature and can be a very heavy component weighing more than 100 kgs, and in some embodiments more than 200 kgs. SEM column 220 can also be directly attached to chamber cover 212. In this manner, any vibrations in a fabrication facility that are transferred to SEM column 220 (and thus to charged particle beam 222) can be equally transferred to optical distance measurement device 260 (and laser beam 262) and thus canceled out.

As depicted in FIG. 2, charged particle column 220 can be rather large and prevents a direct line of sight between laser beam 262 that is introduced into chamber 210 from a position above the chamber lid 212 and the region of interest. Embodiments described herein can employ a series of mirrors to direct laser beam 262 to spot on sample 250 that is near the location where charged particle beam 225 is focused on sample 250. For example, SEM instrument 200 employs mirrors 264 and 266 to direct laser beam 262 from an initial position where the beam is outside the perimeter of charged particle column 220 to the "measured location" which is directly below a portion of the charged particle column and in very close proximity to the region of interest on sample 250 to be imaged. In some embodiments, "very close proximity" means less than or equal to 40 mm, less than or equal to 20 mm, less then or equal to 10 mm or less than or equal to 5 mm. Directing laser beam 262 to a measured location in very close proximity to region of interest minimizes the effects of any potential warpage of sample 250.

As depicted, mirrors 264 and 266 are each positioned within chamber 210 and relatively close to the charged particle beam 225, which can be highly sensitive to magnetic fields. To ensure that mirrors 264, 266 do not adversely effect the trajectory of charged particle beam 225, the mirrors can made from an electrically non-conductive and non-magnetic material. In some embodiments, mirrors 264, 266 are made from a reflective ceramic material and in some embodiments mirrors 264, 266 can include a ceramic reflective surface held in place by an aluminum holder.

After laser beam 262 is directed by mirrors 264, 266 to contact sample 250, some portion of the photons in laser beam 262 are reflected back, through mirrors 266 then 264 to optical distance measurement device 260 as indicated by reflected beam 268. System 260 can then compare emitted laser beam 262 with reflected beam 268 and, using known phase interference techniques, determine the vertical position of the top surface of sample 240 (with respect to the Z-axis) in the measured region working distance of the region, which system 200 can then use to calculate the working distance between SEM column 220 and the region of interest on sample 240. Optical distance measurement device 260 can be continuously project or pulse laser beam 262 and continuously measure the reflected photons 268 directed to spot sampling the phase differences between the two at a very fast rate so that distance is measured in real time and adjustments to the vertical height of sample 240 can be made in real time to keep working distance constant as multiple regions of interest are imaged or otherwise sampled across the surface of sample 250.

In some embodiments, the light radiation beam 262 emitted by ODMD 260 can include two laser beams at different wavelengths integrated into a single beam. Reflected beam 268 can then also include reflections from each of the different wavelengths. Such a configuration can be beneficial in overcoming "dead spots" or other potential issues that can lead to signal loss when imaging transparent samples."

Note that FIG. 2 is not drawn to scale. Instead, it is a schematic representation of SEM instrument 200. Thus, while beam 262 is shown as being spaced away from the location at which charged particle beam 225 contacts sample 240 by approximately half the radius of the sample, some embodiments direct beam 262 much closer to the focal point of charged particle beam 225 than depicted. For example, in some embodiments the distance between the locations at which charged particle beam 225 and laser beam 262 contact sample 250 can be less than 20 mm, less than 10 mm or less than 5 mm while the sample 250 can be a 200 mm or 300 mm wafer.

Figure 3:
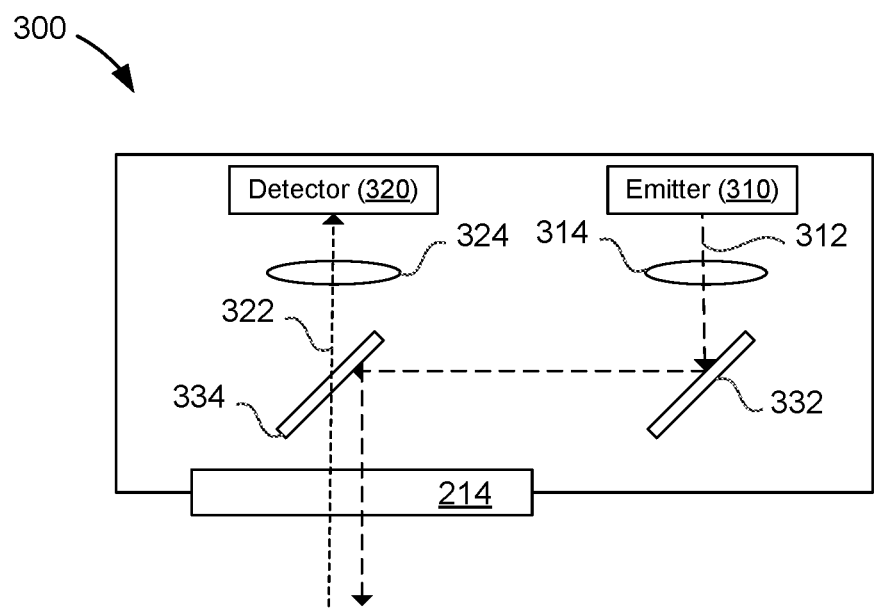
FIG. 3 is a simplified schematic illustration of an optical distance measurement device that can be used with embodiments described herein.

FIG. 3 is a simplified schematic diagram of one embodiments of an optical distance measurement device 300 (referred to herein sometimes as "ODMD 300" for short) according to some embodiments. Optical distance measurement device 300 can be representative of optical distance measurement device 260 discussed above with respect to FIG. 2. It is important to note that ODMD 300 is just one, non-limiting example of an optical distance measurement device that can be used as optical distance measurement device 260. Embodiments disclosed herein are not limited to any particular type of optical measurement device and other suitable types of optical measurement devices can be used instead of ODMD 300 as can be determined by those of skill in the art based on the present disclosure.

As shown, ODMD 300 includes an emitter 310 and a detector 320. Emitter 310 can be an LED or a laser, such as a vertical cavity surface emitting laser (VCSEL) or edge emitting laser (EEL), that generates beam of light radiation 312. In some embodiments, one or more lenses 314 can shape beam 312 by, for example, collimating the beam, before it is reflected by a mirrors 332 and beam splitter 334 through window 214 and into a sample processing chamber, such as vacuum chamber 210.

Photons from beam 312 that are reflected off an object (e.g., sample 240) can be returned to ODMD 300 as represented by reflected beam 322 and detected by detector 320 (e.g., an array of photodiodes). A processor (not shown) can then calculate the distance to the object that the photons of beam 322 using optical interferometry techniques known to those of skill in the art based on interference between beam 312 and reflected beam 322.

SEM Instruments with Optical Distance Measurement Device on Chamber Sidewall

Figure 4:
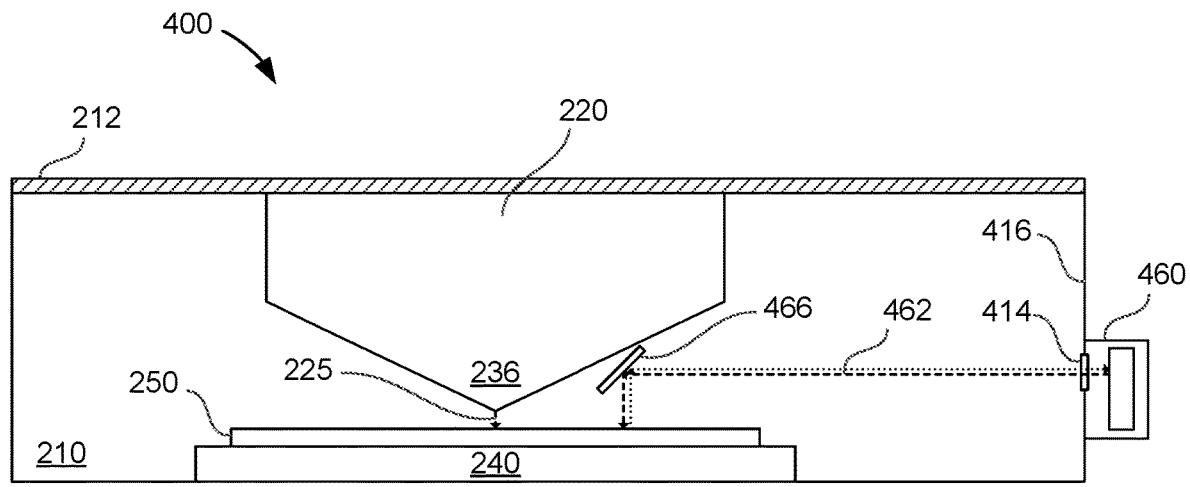
FIG. 4 is a simplified illustration of an evaluation chamber according to some embodiments.

FIG. 4 is a simplified schematic diagram of an SEM instrument 400 according to some additional embodiments. SEM instrument 400 is similar to SEM instrument 200 in many ways and the same reference numbers are used to represent substantially similar elements, which for the sake of brevity, are not described further in conjunction with FIG. 4. As depicted, SEM instrument 400 includes an optical distance measurement device (ODMD) 400 that is attached to a sidewall 416 of chamber 210. ODMD 400 is configured to direct a beam of light 462 (e.g., a laser beam) into chamber 210 through a window 414 formed along the sidewall 416.

The position of ODMD 400 on the sidewall of chamber 210 allows laser beam 462 to be directed to the measurement position on sample 250 with a single mirror 466. Similarly, the single mirror 466 can direct reflections of beam 462 back to ODMD 400 so that the optical measurement device can determine the working distance between SEM column 220 and sample 250 as described above.

Figure 5:
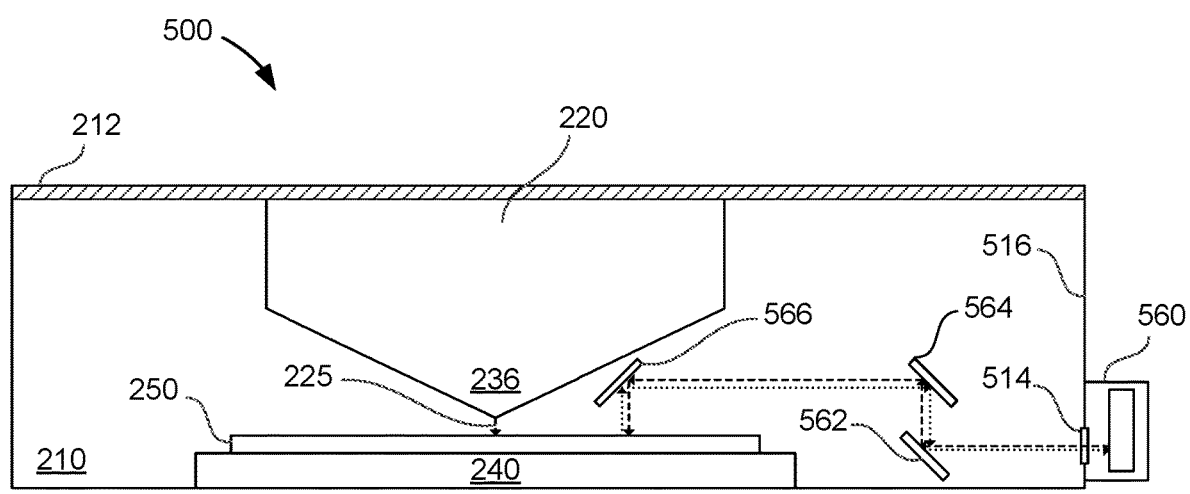
FIG. 5 is a simplified illustration of an evaluation chamber according to some embodiments.

FIG. 5 is a simplified schematic diagram of an SEM instrument 500 according to still more some additional embodiments. SEM instrument 500 is similar to SEM instrument 200 and 400 in many ways and the same reference numbers are used to represent substantially similar elements, which for the sake of brevity, are not described further in conjunction with FIG. 5. As depicted, SEM instrument 500 includes an optical distance measurement device (ODMD) 500 that is attached to a sidewall 516 of chamber 210. Similar to ODMD 400, ODMD 500 is configured to direct a beam of light 462 (e.g., a laser beam) into chamber 210 through a window 514.

ODMD 500 is positioned on the sidewall of chamber 210 at a vertical height that is below that of sample 250, however. Thus, in order to direct a laser beam 562 to the measurement position on sample 250, three separate mirrors 564, 566 and 568 can be employed as shown. Similarly, the same set of three mirrors 564, 566, 568 can direct reflections of beam 562 back to ODMD 500 so that the optical measurement device can determine the working distance between SEM column 220 and sample 250 as described above.

For each of ODMD 400 and ODMD 500 the "measured location" is directly underneath a portion of charged particle column 220 and in very close proximity to where charged particle beam 225 is focused on sample 250 as described above with respect to the optical path associated with optical distance measurement device 260. Additionally, each of the described mirrors 466, 562, 564 and 566 can be made from an electrically non-conductive and non-magnetic material. In some embodiments, the mirrors can be made from a reflective ceramic material and in some embodiments the mirrors 466, 562, 564 and 566 can include a ceramic reflective surface held in place by an aluminum holder.

SEM Instrument with a Magnetic Shield

Figure 6:
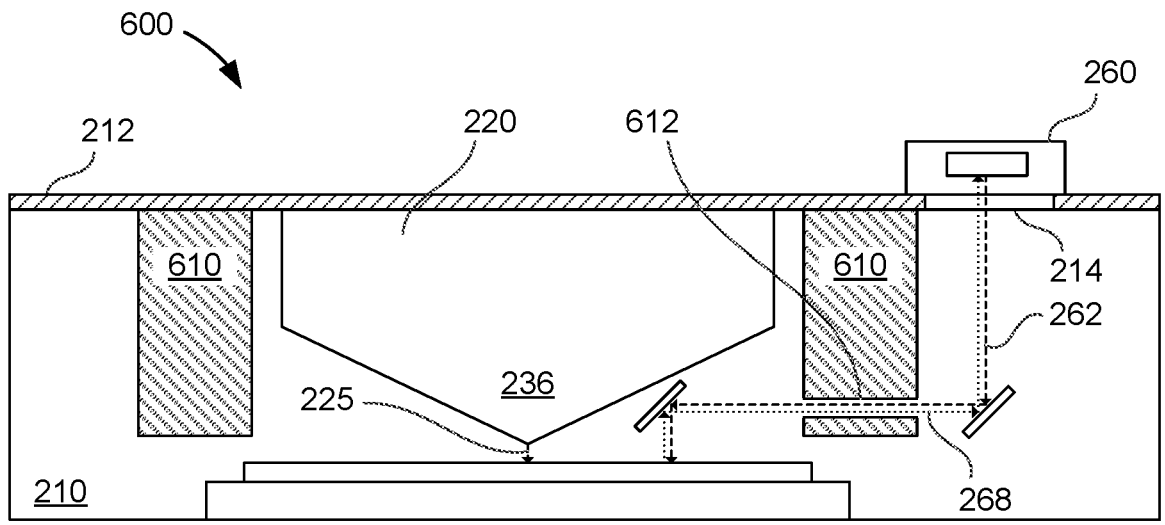
FIG. 6 is a simplified illustration of an evaluation chamber according to some embodiments.

In some embodiments, an SEM instrument can include a magnetic shield that surrounds the tip of the SEM column. FIG. 6 is a simplified schematic diagram of an SEM instrument 600 according to some such embodiments. SEM instrument 500 is similar to SEM instrument 200 except that SEM instrument 500 includes a magnetic shield 610 that completely surrounds an outer periphery of the tip 236 of SEM column 220.

Magnetic shield 610 is made from a material that blocks magnetic fields that might be generated from materials or objects outside of chamber 210 preventing such magnetic fields from adversely impacting the trajectory of charged particle beam 225. The magnetic shield is positioned between optical distance measurement device 260 and the measured location. To enable the laser beam 262 to reach the measured location, embodiments include a channel 612 that extends, in a straight line, through magnetic shield 610. As depicted, the channel 612 also provides a return path for reflected beam 268 to reach optical distance measurement device 260.

In some embodiments, channel 612 can have a circular cross section and can be formed, for example, by boring a hole through a width of the magnetic shield. Embodiments are not limited to any particular cross-sectional shape of channel 612, however, and in other embodiments channel 612 can have a rectangular, a square, an elliptical or other cross-sectional shape.

While FIG. 6 depicts an SEM instrument 600 that adds a magnetic shield to SEM instrument 200, other embodiments can include a similar magnetic shield in SEM instruments 400 and 500 discussed above with respect to FIGS. 4 and 5, respectively.

Example of a Sample to be Imaged

As stated above, embodiments of the disclosure can be used to ensure that the working distance between an SEM column and sample being imaged is precisely set to the desired distance. Embodiments can be used to measure and adjust the working distance when imaging many different types of samples including electronic circuits formed on semiconductor structures, solar cells formed on a polycrystalline or other substrate, nanostructures formed on various substrates and the like.

Additional Embodiments

The foregoing description, for purposes of explanation, used specific nomenclature to provide a thorough understanding of the described embodiments. However, it will be apparent to one skilled in the art that the specific details are not required in order to practice the described embodiments. For example, while examples set forth above discussed an optical distance measurement device that used optical interferometry techniques to determine the measured working distance, other embodiments can include an optical distance measurement device that uses other suitable techniques, such as detecting the time of flight of the reflected radiation beam. As another example, while systems described above included a scanning electron microscope as the charged particle column, in other embodiments the charged particle column can be a focused ion beam column and in still other embodiments, the system can include both SEM and FIB columns as part of a SEM/FIB tool.

While different embodiments of the disclosure were disclosed above, the specific details of particular embodiments may be combined in any suitable manner without departing from the spirit and scope of embodiments of the disclosure. Further, it will be apparent to one of ordinary skill in the art that many modifications and variations are possible in view of the above teachings. It is, therefore, to be understood that the appended claims are intended to cover all such modifications and changes as fall within the true spirit of the embodiments of the disclosure.

Where the illustrated embodiments of the present disclosure can, for the most part, be implemented using electronic components and circuits known to those skilled in the art, details of such are not be explained in any greater extent than that considered necessary as illustrated above, for the understanding and appreciation of the underlying concepts of the present disclosure and in order not to obfuscate or distract from the teachings of the present disclosure.

Additionally, any reference in the specification above to a method should be applied mutatis mutandis to a system capable of executing the method and should be applied mutatis mutandis to a computer program product that stores instructions that once executed result in the execution of the method. Similarly, any reference in the specification above to a system should be applied mutatis mutandis to a method that may be executed by the system should be applied mutatis mutandis to a computer program product that stores instructions that can be executed by the system; and any reference in the specification to a computer program product should be applied mutatis mutandis to a method that may be executed when executing instructions stored in the computer program product and should be applied mutandis to a system that is configured to executing instructions stored in the computer program product.

What is claimed is:

1. A system for processing a sample, the system comprising:
   a vacuum chamber having a window formed along one of its walls;
   a sample support configured to hold a sample within the vacuum chamber during a sample processing operation and move the sample within the vacuum chamber along the X, Y and Z axes;
   a charged particle beam column configured to direct a charged particle beam into the vacuum chamber and focus the beam to collide with a region of interest on the sample;
   an optical distance measurement device configured to generate and direct electromagnetic radiation into the vacuum chamber through the window, detect photons from the electromagnetic radiation reflected off the sample, and determine a working distance between the sample and charged particle column based on the generated electromagnetic radiation and the detected photons; and
   one or more mirrors disposed within the vacuum chamber and positioned to direct the electromagnetic radiation generated by the optical distance measurement device to a measured location on the sample that is within 20 mm of the region of interest, the one or more mirrors comprising at least one mirror positioned directly under a portion of the charged particle column.

2. The system for processing a sample set forth in claim 1 wherein the charged particle column is a scanning electron microscope (SEM) column and the charged particle beam is an electron beam.

3. The system for processing a sample set forth in claim 1 wherein the optical distance measurement device is configured to generate and direct a laser beam into the vacuum chamber through the window.

4. The system for processing a sample set forth in claim 3 wherein the window is formed in a chamber lid of the vacuum chamber and the optical distance measurement device is attached directly to the chamber lid and aligned to project the laser beam through the window.

5. The system for processing a sample set forth in claim 1 wherein the system further includes one or more processors and computer-readable memory operably coupled to the one or more processors, wherein the computer-readable memories includes instructions that, when executed by the one or more processors cause the system to adjust a vertical spacing between the charged particle column and the sample based on a difference between the determined working distance and an intended working distance.

6. The system for processing a sample set forth in claim 1 wherein the optical distance measurement device uses interferometry techniques to determine the working distance between the charged particle column and the sample at the measured location.

7. The system for processing a sample set forth in claim 1 wherein each of the one or more mirrors comprise a reflective ceramic material.

8. A method of processing a sample in a vacuum chamber with a charged particle column, the method comprising:
   positioning the sample on a sample support in the vacuum chamber such that a region of interest is directly under a tip of the charged particle column;
   directing electromagnetic radiation to a measured location on the sample in close proximity to the region of interest and directly under a portion of the charged particle column;
   detecting photons reflected from the measured location; and
   determining a working distance between the charged particle column and the sample at the measured location based on the emitted electromagnetic radiation and the detected photons;
   wherein the electromagnetic radiation is generated by a device outside the vacuum chamber and directed through a window of the vacuum chamber to the measured location by one or more mirrors at least one of which is positioned directly under a portion of the charged particle column; and
   wherein the measured location is within 20 mm of the region of interest.

9. The method set forth in claim 8 further comprising adjusting vertical spacing between the charged particle column and the sample based on a difference between the determined working distance and an intended working distance.

10. The method set forth in claim 8 further comprising imaging the region of interest by scanning a charged particle beam generated by the charged particle column across the region of interest.

11. The method set forth in claim 8 wherein the electromagnetic radiation is in the visible or infrared spectrum.

12. The method set forth in claim 8 wherein the device that generates the electromagnetic radiation uses interferometry techniques to determine the working distance between the charged particle column and the sample at the measured location.

13. The method set forth in claim 12 wherein the electromagnetic radiation generated by the device is in the form of a laser beam.

14. The method set forth in claim 8 wherein the measured location is within 10 mm of the region of interest.

15. The method set forth in claim 8 wherein the sample is an electrically nonconductive wafer.

16. A non-transitory computer-readable memory that stores instructions for processing a sample in a vacuum chamber with a charged particle column by:
   positioning the sample on a sample support in the vacuum chamber such that a region of interest is directly under a tip of the charged particle column;
   directing electromagnetic radiation to a measured location on the sample in close proximity to the region of interest and directly under a portion of the charged particle column;

detecting photons reflected from the measured location; and determining a working distance between the charged particle column and the sample at the measured location based on the emitted electromagnetic radiation and the detected photons;

wherein the electromagnetic radiation is generated by a device outside the vacuum chamber and directed through a window of the vacuum chamber to the measured location by one or more mirrors at least one of which is positioned directly under a portion of the charged particle column; and wherein the measured location is within 20 mm of the region of interest.

17. The non-transitory computer-readable memory set forth in claim 16 wherein the instructions for processing a sample in a vacuum chamber with a charged particle column further include instructions to adjust a vertical spacing between the charged particle column and the sample based on a difference between the determined working distance and an intended working distance.

18. The non-transitory computer-readable memory set forth in claim 16 wherein the instructions for processing a sample in a vacuum chamber with a charged particle column further include instructions image the region of interest by scanning a charged particle beam generated by the charged particle column across the region of interest.

19. The non-transitory computer-readable memory set forth in claim 16 wherein the device that generates the electromagnetic radiation uses interferometry techniques to determine the working distance between the charged particle column and the sample at the measured location and wherein the electromagnetic radiation generated by the device is in the form of a laser beam.

\* \* \* \* \*